United States Patent [19]

Ohta et al.

[11] Patent Number: 5,006,844
[45] Date of Patent: Apr. 9, 1991

[54] TIRE ABNORMALITY DETECTING DEVICE

[75] Inventors: Katsuhiro Ohta; Hisami Masuda; Mamoru Makishima, all of Tokyo, Japan

[73] Assignee: TDK Corporation, Tokyo, Japan

[21] Appl. No.: 373,846

[22] Filed: Jun. 29, 1989

[30] Foreign Application Priority Data

Jul. 4, 1988 [JP] Japan .............................. 63-89200[U]

[51] Int. Cl.⁵ ............................................ B60C 23/02
[52] U.S. Cl. .................................. 340/448; 340/449
[58] Field of Search ................... 340/448, 449, 445; 73/146.5; 336/192; 333/185, 219, 175

[56] References Cited

U.S. PATENT DOCUMENTS

| | | | |
|---|---|---|---|
| 3,665,387 | 5/1972 | Enabnit | 340/448 |
| 4,052,696 | 10/1977 | Enabnit | 340/448 |
| 4,118,678 | 10/1978 | Goshima et al. | 333/185 |
| 4,300,118 | 11/1981 | Matsuda et al. | 340/448 |
| 4,312,001 | 1/1982 | Marzolf | 340/448 X |
| 4,314,221 | 2/1982 | Satou et al. | 336/212 X |
| 4,393,364 | 7/1983 | Suda et al. | 336/192 X |
| 4,605,845 | 8/1986 | Takeda | |
| 4,737,761 | 4/1988 | Dosjoub et al. | 340/448 |
| 4,758,922 | 7/1988 | Ishigaki et al. | 333/219 X |
| 4,761,996 | 8/1988 | Schmid et al. | 340/448 X |
| 4,790,179 | 12/1988 | Hettich et al. | 340/448 X |

FOREIGN PATENT DOCUMENTS

| | | |
|---|---|---|
| 2296170 | 9/1975 | France . |
| 2342860 | 2/1977 | France . |
| 5510159 | 6/1978 | Japan . |
| 53-151366 | 12/1978 | Japan . |
| 55-41552 | 3/1980 | Japan . |
| 55-55560 | 4/1980 | Japan . |
| 55-55561 | 4/1980 | Japan . |
| 55-80512 | 6/1980 | Japan . |
| 55-176645 | 12/1980 | Japan . |
| 56-104228 | 8/1981 | Japan . |
| 56-192689 | 11/1981 | Japan . |
| 59-223011 | 12/1984 | Japan . |
| 1393633 | 5/1975 | United Kingdom ................ 333/219 |
| 2108304 | 1/1982 | United Kingdom . |

*Primary Examiner*—Joseph A. Orsino
*Assistant Examiner*—Brian R. Tumm
*Attorney, Agent, or Firm*—Armstrong, Nikaido, Marmelstein, Kubovcik & Murray

[57] ABSTRACT

A tire abnormality detecting device has a first unit to be provided on a vehicle body side and a second unit to be provided on a tire side. The first unit includes an electrical signal generating source for generating a specific electrical signal, a first coil device for generating an induction voltage in receipt of the electrical signal, and a device for detecting a change in the induction voltage of the first coil device. The second unit includes a second coil device adapted to be magnetically connected to the first coil device, a third coil device having a magnetic core formed of a temperature sensing magnetic material to form a resonance circuit in cooperation with the second coil device, and a switch mechanism for changing a time constant of the resonance circuit in response to a change in air pressure in a tire. With this construction, the abnormal reduction in air pressure in the tire and/or the abnormal increase in temperature of the tire can be detected.

4 Claims, 4 Drawing Sheets

TIRE ABNORMALITY DETECTING DEVICE

BACKGROUND OF THE INVENTION

The present invention relates to a device for detecting abnormality of air pressure and temperature in a tire during running of a vehicle.

Conventionally, a tire air pressure warning device is known for warning of a reduction in air pressure in the tire, to avoid danger caused by damage of the tire due to abnormal heat generation in the tire under a reduced air pressure. An example of the tire air pressure warning device is shown in FIGS. 8 and 9 (Japanese Utility Model Laid-open Publication No. 55-10159).

Referring to FIG. 8, reference numerals 21 and 22 designate a tire and a road wheel, respectively. A warning device 23 is fixedly mounted at a central portion of the road wheel 22 by tightening a wheel nut 24 to a wheel bolt. The warning device includes a battery, a buzzer driving circuit, a tire rotation detecting switch, etc. An air pressure sensor 25 is mounted to a wheel rim to receive an air pressure from an air valve and detect a reduction in the air pressure in the tire. A battery check button 26 is provided at the air pressure sensor 25.

Referring to FIG. 9 which shows a buzzer driving circuit in the warning device 23, the circuit includes a battery 27, a buzzer 28 and a tire rotation detecting switch 29 adapted to be closed during rotation of the tire and be opened upon stoppage of the tire. The air pressure sensor 25 includes an air pressure sensing contact 25a and a battery checking contact 25b. A transistor Tr1 is provided to control the supply of current to the buzzer 28. The transistor Tr1 goes on when a signal is input thereto from an oscillating circuit 30 such as an astable multivibrator, and connects the buzzer 28 through the air pressure sensing contact 25a to the battery 27. The tire rotation detecting switch 29 inputs a signal to the oscillating circuit 30 when the air pressure sensing contact 25a is closed upon reduction in air pressure during rotation of the tire, and thereby turn on the transistor Tr1 to drive the buzzer 28. On the other hand, when the tire 21 is in a rest condition, the tire rotation detecting switch 29 does not input a signal to the oscillating circuit 30 to maintain the transistor Tr1 in an off state and thereby prevent current consumption of the battery 27. The battery checking contact 25b is closed by depressing the check button 26 of the air pressure sensor 25 to input a signal to the oscillating circuit 30 and thereby enable an operator to confirm whether or not the battery 27 is consumed. A capacitor C1 and a resistor R1 form a hold circuit for operating the oscillating circuit 30 for a period of time depending on the resistor R1 once the capacitor C1 is charged by closing the battery checking contact 25b or the air pressure sensing contact 25a and the tire rotation detecting switch 29.

As mentioned above, a reduction in air pressure of the tire is detected by closing the air pressure sensing contact of the air pressure sensor in the air pressure warning device. Further, as the air pressure sensor is connected through a lead wire to the warning device, there is a possibility of the lead wire being broken. Accordingly, a long time is required for maintenance and inspection of the warning device.

Furthermore, the warning device as mentioned above detects a reduction in air pressure only, and cannot detect abnormal temperature increase without a change in air pressure. To solve this problem, it is necessary to provide a device for detecting an air temperature in the tire and a circuit for processing the result of detection of the air temperature in addition to the tire air pressure warning device, which will cause an increase in the number of parts, an increase in weight of the device and an increase in cost.

SUMMARY OF THE INVENTION

It is an object of the present invention to provide a tire abnormality detecting device having both a tire pressure detecting function and a tire temperature detecting function which may detect an abnormal reduction in air pressure in a tire and an abnormal increase in temperature in the tire during running of a vehicle.

According to the present invention, there is provided a tire abnormality detecting device comprising a first unit to be provided on a vehicle body side and a second unit to be provided on a tire side. The first unit includes an electrical signal generating source for generating a specific electrical signal, a first coil device for generating an induction voltage in receipt of the electrical signal, and a device for detecting a change in the induction voltage of the first coil device. The second unit includes a second coil device adapted to be magnetically connected to the first coil device, a third coil device having a magnetic core formed of a temperature sensing magnetic material to form a resonance circuit in cooperation with the second coil device, and a switch mechanism for changing a time constant of the resonance circuit in response to a change in air pressure in a tire.

The temperature sensing magnetic material has a Curie point, and when temperature changes, transition between paramagnetism and ferromagnetism of the temperature sensing magnetic material is generated with respect to the Curie point. Accordingly, a change in temperature can be detected by sensing such a transition. Thus, the coil device employing the temperature sensing magnetic material as the magnetic core functions as a coil and a temperature sensor. As the resonance circuit of the sensor unit includes this coil device, both the detections of abnormal air pressure reduction and abnormal temperature increase can be effected.

DETAILED DESCRIPTION OF THE PREFERRED EMBODIMENTS

Figure 1:
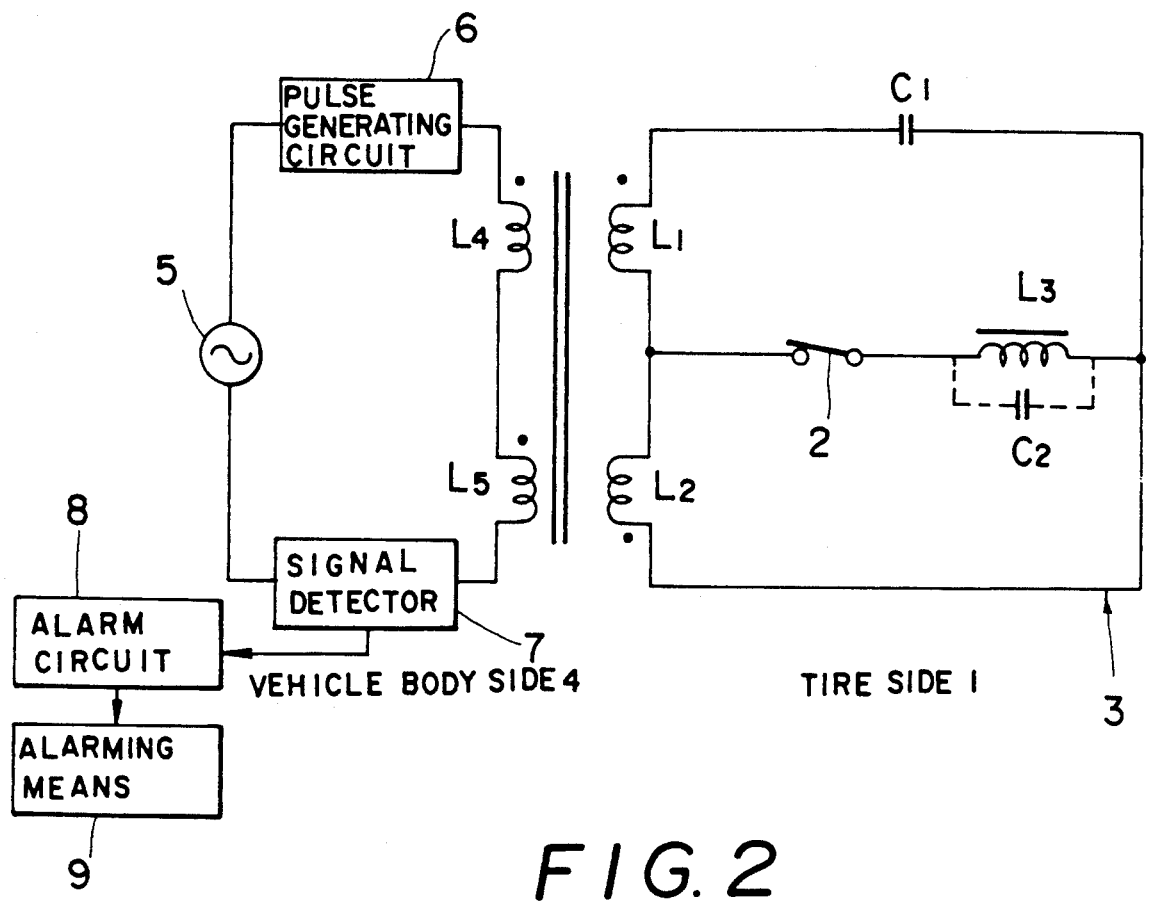
FIG. 1 is a circuit diagram of a preferred embodiment of the present invention.

Referring now to FIG. 1 which shows a circuit diagram of a preferred embodiment according to the present invention, a signal is transmitted and received in a non-contact manner between a tire side 1 and a vehicle body side 4. The tire side 1 includes a sensor unit 3 formed by a resonance circuit consisting of coils L1 and L2 inducing a voltage from coils L4 and L5 on the vehicle body side 4, a capacitor C1, a pressure valve 2 as a switch mechanism adapted to be opened and closed according to a pressure change in the tire, and a coil device L3 having a magnetic core formed of a temperature sensing magnetic material changing a permeability according to a temperature change in the tire.

On the other hand, the vehicle body side 4 includes a power source 5, a pulse generating circuit 6 as an electrical signal generating source having a circuit for generating a specific electrical signal, e.g., a rectangular wave or a high frequency modulated wave as a pulse according to a tire rotating speed in receipt of voltage from the power source 5, coils L4 and L5 for generating an induction voltage in the coils L1 and L2 in receipt of a pulse voltage as an output from the pulse generating circuit 6, and a signal detector 7 for detecting a pulse change due to a circuit change in the sensor unit 3 according to the operation of the pressure valve 2. An alarm circuit 8 is connected to the signal detector 7, and an alarming means 9 such as a buzzer is connected to the alarm circuit 8. The coils L1 and L2 of the tire side 1 have a polarity different from a polarity of the coils L4 and L5 of the vehicle body side 4. The pressure valve 2 is normally closed.

The signal detector 7 is constructed by a voltage comparator for comparing an induction voltage generated by the coils L4 and L5 with a preset reference voltage and generating an abnormal signal when the result of comparison exceeds a permissible value. The alarm circuit 8 is constructed by a circuit for driving the alarming means 9.

Figure 2:
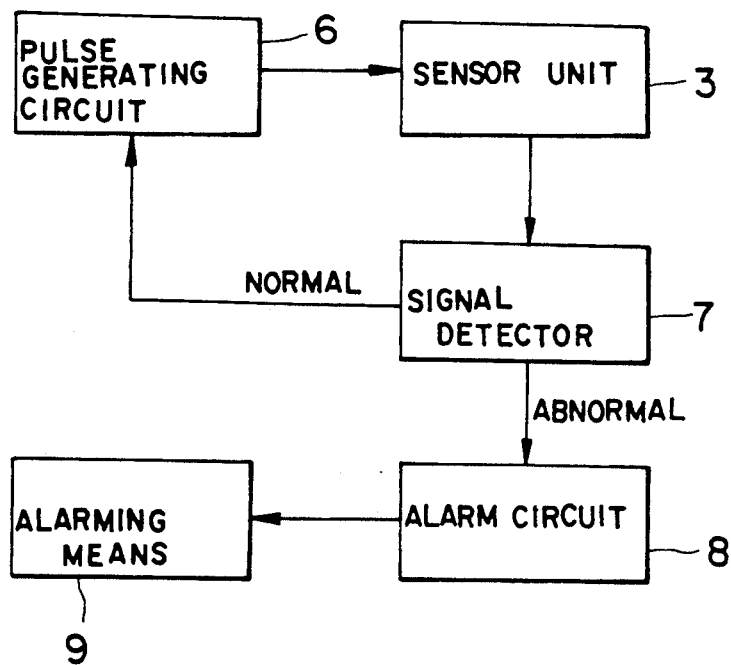
FIG. 2 is a schematic block diagram illustrating the operation of the present invention.

There will now be described the operation of the above-mentioned tire abnormality detecting device with reference to FIGS. 2 and 3.

When air pressure in the tire is reduced because of crack, puncture or any other causes (e.g., standing wave phenomenon) of the tire during running of an automobile, and the air pressure becomes less than a predetermined value (e.g., 1.6–2.5 kgf/cm$^2$), the pressure valve 2 is opened to cause a remarkable change in time constant of the circuit in the sensor unit 3. As a result, the pulse to be generated from the pulse generating circuit 6 in the vehicle body side 4 is remarkably changed, and such a pulse change is detected by the signal detector 7. A detection signal generated from the signal detector 7 is fed to the alarm circuit 8 which in turn drives the alarming means 9, thus informing an operator of the tire abnormality.

Figure 3:
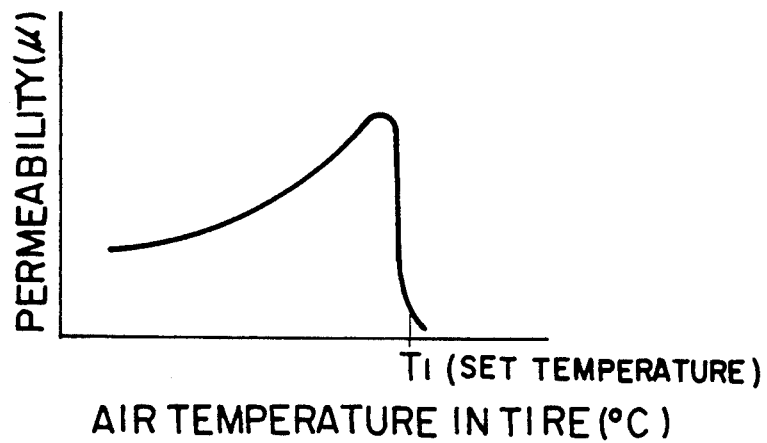
FIG. 3 is a characteristic graph illustrating the relation between an air temperature in a tire and a permeability of the temperature sensing magnetic material to be used in the present invention.

On the other hand, when temperature of the tire increases abnormally to a certain temperature higher than 90° C., for example during running of the automobile under the condition where the air pressure in the tire does not becomes less than the predetermined value, the permeability of the temperature sensing magnetic material (ferrite) as the magnetic core of the coil device L3 in the sensor unit 3 of the tire side 1 is rapidly reduced at a set temperature T1 (Curie point) as shown in FIG. 3 since a transition occurs from ferromagnetism to paramagnetism. As a result, the time constant of the circuit in the sensor unit 3 is remarkably changed to cause a remarkable change in the pulse to be generated from the pulse generating circuit 6 of the vehicle body 4. Such a change is detected by the signal detector 7. Accordingly, the tire abnormality (abnormal increase in temperature of the tire) can be detected through the alarm circuit 8 and the alarming means 9 warns the operator, thereby preventing the occurrence of a possible accident. Further, as the polarity of the coils L1 and L2 is different from that of the coils L4 and L5, a difference in the time constant between under a balanced condition and an abnormal condition may be made large to thereby improve the sensitivity of detection.

Although the detection of the reduction in air pressure in the tire and the detection of the increase in temperature of the tire have been explained individually in the above description, both the detections are simultaneously carried out during running of the automobile. Further, the temperature sensing magnetic material to be used for the magnetic core of the coil device L3 may be suitably selected according to the set temperature.

The present invention is not limited to the above preferred embodiment but any other modifications may be made. For example, a capacitor may be connected in series with the coil device L3, or a capacitor C2 may be connected in parallel to the coil device L3 as shown by a broken line in FIG. 1.

Figure 4:
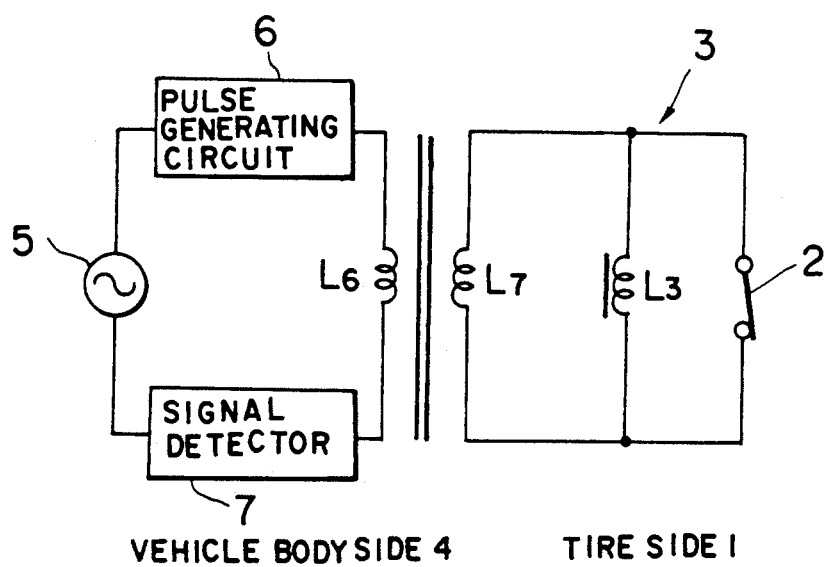
FIG. 4 is a circuit diagram of another preferred embodiment of the present invention.

Referring to FIG. 4 which shows another preferred embodiment of the present invention, the sensor unit 3 of the tire side 1 is constituted of a coil L7 for generating a voltage to be induced by a coil L6 of the vehicle body side 4, a coil device L3 using a temperature sensing magnetic material as the magnetic core, and a normally closed pressure valve 2, wherein the coil device L3 and the pressure valve 2 are connected in parallel to the coil L7. When the air pressure in the tire becomes less than the predetermined value and/or the temperature in the tire becomes greater than the set temperature, the time constant of the circuit in the sensor unit 3 is remarkably changed to thereby inform the operator of the tire abnormality in the same manner as the previous preferred embodiment.

As mentioned above, the present invention essentially includes the coil device using a temperature sensing magnetic material as the magnetic core for detecting the temperature abnormality of the tire and the pressure valve for detecting the pressure abnormality of the tire. Thus, the temperature abnormality and/or the pressure abnormality are/is detected to operate the coil device L3 and/or the pressure valve 2 and remarkably change the time constant of the circuit in the sensor unit 3. Such a change causes a change in pulse signal which is in turn detected by the signal detector 7. Accordingly, any other modifications of the circuit in the sensor unit 3 capable of causing such a change in pulse signal may be made.

Figure 5A:
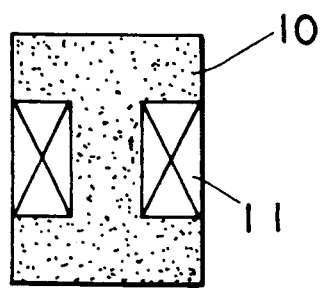
FIGS. 5A and 5B are sectional views of different types of the coil device to be used in the present invention.
Figure 5B:
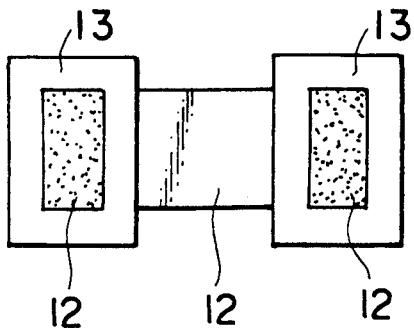

FIGS. 5A and 5B show different preferred embodiments of the coil device L3 in the sensor unit 3. The coil device (inductor) L3 shown in FIG. 5A is constituted of a drum core 10 and a coil 11 wound around the drum core 10. The coil device L3 shown in FIG. 5B is constituted of a toroidal core 12 and a coil 13 wound around the toroidal core 12. Both the cores employ a temperature sensing magnetic material (temperature sensing ferrite) having a predetermined Curie point.

Figure 6:
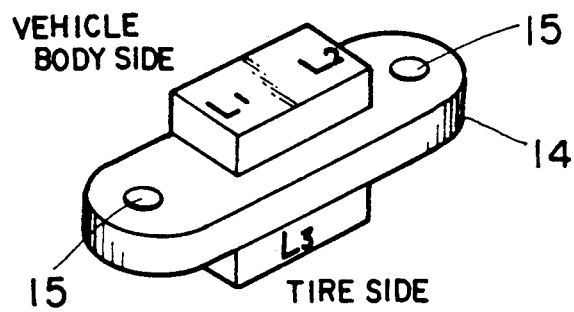
FIG. 6 is a schematic perspective view of the sensor unit according to the present invention.

Referring to FIG. 6 which is a perspective view of the sensor unit 3 formed of an insulating material, the sensor unit 3 includes the coils L1 and L2, the capacitor C1, the coil device L3 and the pressure valve 2. Reference numeral 14 denotes a mounting portion having a pair of mounting holes 15 through which bolts or the like are inserted for tightly mounting the sensor unit 3 to a tire wheel base or the like. Any suitable mounting means other than the bolts may be selected in consideration of air tightness. In mounting the sensor unit 3, the coil device L3 and the pressure valve 2 are disposed on the tire side, and the coils L1 and L2 are disposed on the vehicle body side. It is appreciated that the shape and the circuit construction of the sensor unit 3 may be suitably modified.

Figure 7:
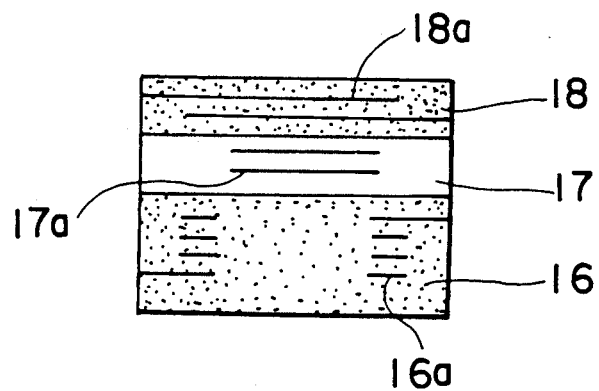
FIG. 7 is a sectional view of another preferred embodiment of the sensor unit forming an integrated coil.
Figure 8:
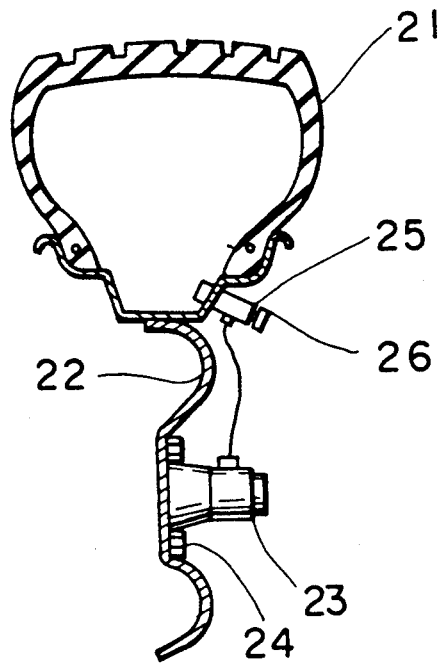
FIG. 8 is a sectional view of a prior art device.
Figure 9:
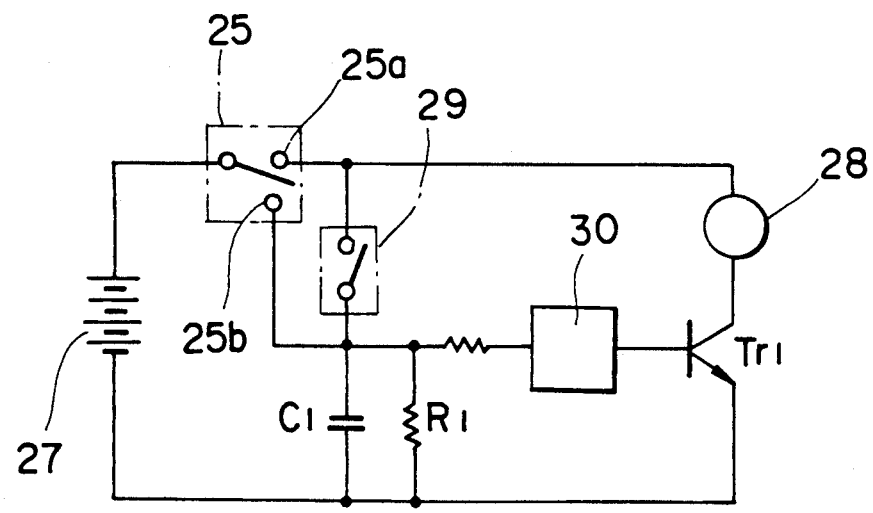
FIG. 9 is a circuit diagram of the prior art device shown in FIG. 8.

FIG. 7 shows a modification of the sensor unit 3 in cross section. The sensor unit 3 is constructed of a composite element such as an integrated coil formed by stacking a temperature sensing magnetic coil 16 including a coil pattern 16a, a resistor 17 including a conductor pattern 17a, and a dielectric capacitor 18 including a conductor pattern 18a. With this construction, the sensor unit 3 can be made compact and lightweight.

As described above, the present invention can exhibit the following effects.

(1) The abnormality of the tire can be detected in a noncontact manner by the sensor unit on the tire side and the detector unit on the vehicle body side. Therefore, there is no possibility of breaking of wiring, thereby reducing time for maintenance and inspection.

(2) As the sensor unit requires no power source such as a battery, a life of the sensor unit and the detecting device can be extended.

(3) As the abnormal pressure reduction and the abnormal temperature increase can be sensed by the same sensor circuit and detected by the same detecting means, there are no problems such as an increase in the number of parts, an increase in weight of the device and an increase in cost.

What is claimed is:

1. A tire abnormality detecting device comprising:
   a first unit to be provided on a vehicle body side, said first unit including
      an electrical signal generating source for generating a specific electrical signal,
      a first coil device, serially connected to said electrical signal generating source, for generating an induction voltage in receipt of said electrical signal, and
      detecting means, serially connected to first coil device, for detecting a change in said induction voltage of said first coil device; and
   a second unit provided on a tire side, said second unit including
      a second coil device to be magnetically connected to said first coil device, said second coil device having first and second coils and a capacitor respectively connected in series,
      a switch mechanism, connected between a junction of said first and second coils, opening and closing in response to a change in air pressure in a tire, and
      a third coil device, connected in series between said switch mechanism and said capacitor, said second and third coil devices forming a resonance circuit, said third coil device having a temperature detecting magnetic core,
   wherein said detecting means detects said change in said induction voltage of said first coil device generated by said second coil device according to one of (a) an open/close condition of said switch mechanism and (b) magnetic permeability of said third coil device.

2. The tire abnormality detecting device as defined in claim 1, wherein said temperature detecting magnetic core is a drum core.

3. The tire abnormality detecting device as defined in claim 1, wherein said temperature detecting magnetic core is a toridal core.

4. The tire abnormality detecting device as defined in claim 1, wherein said resonance circuit formed of said second and third coil devices is formed of said temperature detecting magnetic core having a coil pattern and a dielectric having an electroconductive pattern.

* * * * *